United States Patent
Gao et al.

(10) Patent No.: US 10,553,062 B2
(45) Date of Patent: Feb. 4, 2020

(54) METHOD FOR GENERATING WINNING NUMBERS AND APPARATUS

(71) Applicant: Huawei Technologies Co., Ltd., Shenzhen (CN)

(72) Inventors: Shang Gao, Wuhan (CN); Heng Liao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/915,904

(22) Filed: Mar. 8, 2018

(65) Prior Publication Data

US 2018/0197362 A1 Jul. 12, 2018

Related U.S. Application Data

(63) Continuation of application No. PCT/CN2015/095093, filed on Nov. 20, 2015.

(51) Int. Cl.
*G07F 17/32* (2006.01)
*G07C 15/00* (2006.01)
*H04L 9/08* (2006.01)

(52) U.S. Cl.
CPC .......... *G07C 15/006* (2013.01); *H04L 9/0869* (2013.01); *G07F 17/329* (2013.01)

(58) Field of Classification Search
None
See application file for complete search history.

(56) References Cited

U.S. PATENT DOCUMENTS

| | | | |
|---|---|---|---|
| 7,909,691 B1 | 3/2011 | Skatter | |
| 8,522,052 B1* | 8/2013 | Lesea | H03K 19/1733 713/194 |
| 9,213,835 B2* | 12/2015 | Lesea | G06F 21/755 |
| 2010/0067685 A1 | 3/2010 | Okita | |
| 2012/0213358 A1* | 8/2012 | Dror | G06F 7/588 380/28 |

FOREIGN PATENT DOCUMENTS

| | | |
|---|---|---|
| CN | 1487458 A | 4/2004 |
| CN | 101542969 A | 9/2009 |
| CN | 102708532 A | 10/2012 |

(Continued)

*Primary Examiner* — Ronald Laneau
(74) *Attorney, Agent, or Firm* — Leydig, Voit & Mayer, Ltd.

(57) ABSTRACT

A method for generating target winning numbers is provided. The method implemented by a first node includes: receiving, in a first period of time, n encrypted random parameters sent by n second nodes in a system, where n is a positive integer; receiving, in a second period of time, n mapping relationships and n keys that are sent by the n second nodes, where each mapping relationship is a one-to-one mapping relationship between an encrypted random parameter and a key; and decrypting, in a third period of time, the n encrypted random parameters by using the n mapping relationships and the n keys, to obtain a target random parameter set, and generating target winning numbers by using the target random parameter set, so that each node can generate the winning numbers and verify impartiality of the winning numbers, thereby increasing randomness of a random parameter.

20 Claims, 3 Drawing Sheets

(56) References Cited

FOREIGN PATENT DOCUMENTS

| | | | |
|---|---|---|---|
| CN | 103295311 | A | 9/2013 |
| CN | 104299156 | A | 1/2015 |
| EP | 2000900 | A2 | 12/2008 |
| GB | 2495085 | A | 4/2013 |
| WO | 2008024705 | A2 | 2/2008 |

* cited by examiner

METHOD FOR GENERATING WINNING NUMBERS AND APPARATUS

CROSS-REFERENCE TO RELATED APPLICATIONS

This application is a continuation of International Application No. PCT/CN2015/095093, filed on Nov. 20, 2015, the disclosure of which is hereby incorporated by reference in its entirety.

TECHNICAL FIELD

Embodiments of the present invention relates to the field of computer technologies, and in particular, to a method for generating winning numbers and an apparatus.

BACKGROUND

Currently, a computer is mostly used to generate a lot drawing result for various lot drawings (for example, a digital lottery, an Internet lottery, and the like). Winning numbers are generated mainly according to random numbers entered into the computer, an embedded random algorithm, or the like. Even though a specified computer program is used, the entered random numbers may still be artificially manipulated. Therefore, these random numbers and winning numbers may be forged, and fairness and reliability of drawing a lottery are poor. At present, a random number selection range is usually expanded or a specific random signal is used as computer input, so as to reduce a degree of people's suspicion about the lot drawing result to some extent.

In the conventional art, a relevant system is customized to require a lottery agency to use a specified computer program, so that a computer can be used to generate highly complicated random numbers. However, the public cannot supervise a process of using these random numbers for lot drawing. That is, in this process, the public cannot verify authenticity of an actual lot drawing process, and can only verify whether they win a lottery. Essentially, even though the highly complicated random numbers are used for the lot drawing, it cannot be guaranteed that final winning numbers are a true and random result.

SUMMARY

This application provides a method for generating winning numbers and an apparatus, so as to solve a problem that the public cannot verify authenticity of an existing process of drawing a lottery.

A first aspect provides a method for generating winning numbers, where the method includes:

receiving, by a first node in a first period of time, n encrypted random parameters sent by n second nodes in a system, where n is a positive integer;

receiving, by the first node in a second period of time, n mapping relationships and n keys that are sent by the n second nodes, where each mapping relationship is a one-to-one mapping relationship between an encrypted random parameter and a key; and decrypting, by the first node in a third period of time, the n encrypted random parameters by using the n mapping relationships and the n keys, to obtain a target random parameter set, and generating target winning numbers by using the target random parameter set, where the first period of time, the second period of time, and the third period of time are chronologically arranged in ascending order. Each node that participates in a lot drawing is set to participate in a process of generating the winning numbers, so that each node can generate the winning numbers and verify impartiality of the winning numbers, thereby increasing randomness of a random parameter. In addition, with all-people participation, fun of a lot drawing process may further be improved, and more users are attracted to participate in the lot drawing, thereby improving user experience.

With reference to the first aspect, in a first implementation of the first aspect of the present invention, after the decrypting, by the first node in a third period of time, the n encrypted random parameters by using the n mapping relationships and the n keys, to obtain a target random parameter set, the method further includes:

sending, by the first node, the target random parameter set to the n second nodes in a fourth period of time.

In this way, each node can determine and obtain a random parameter set with a smallest difference, and generate final winning numbers by using the random parameter set with the smallest difference, and also can verify validity of the random parameter set for generating the winning numbers by each node, so that data validity and impartiality are effectively improved.

With reference to the first implementation of the first aspect, in a second implementation of the first aspect, after the decrypting, by the first node in a third period of time, the n encrypted random parameters by using the n mapping relationships and the n keys, to obtain a target random parameter set, and before the generating target winning numbers by using the target random parameter set, the method further includes:

receiving, by the first node in the fourth period of time, n random parameter sets sent by the n second nodes;

comparing the n random parameter sets sent by the n second nodes with the target random parameter set; and determining, from the n random parameter sets and the target random parameter set, a first candidate random parameter set that has a smallest difference with the other random parameter sets; and the generating the target winning numbers by using the target random parameter set includes:

generating, by the first node, the target winning numbers by using the first candidate random parameter set.

In this way, each node can determine and obtain the n random parameter sets with the smallest difference, and generate the final winning numbers by using the n random parameter sets with the smallest difference.

With reference to the first aspect, in a third implementation of the first aspect of the present invention, after the decrypting, by the first node in a third period of time, the n encrypted random parameters by using the n mapping relationships and the n keys, to obtain a target random parameter set, the method further includes:

sending, by the first node, the target winning numbers to the n second nodes in the fourth period of time.

In this way, these second nodes can determine a difference between winning numbers generated by these second nodes themselves and winning numbers generated by another node, and use winning numbers with a smallest difference as the final winning numbers, so that data accuracy is effectively improved.

With reference to the first implementation of the first aspect, in a fourth implementation of the first aspect of the present invention, after the sending, by the first node, the target random parameter set to the n second nodes in a fourth period of time, or after the sending, by the first node, the target winning numbers to the n second nodes in the fourth period of time, the method further includes:

receiving, by the first node in the fourth period of time, n winning numbers sent by the n second nodes;

counting a quantity of winning numbers that exist in both the target winning numbers and the n winning numbers; and using, by the first node as the target winning numbers, winning numbers that exist in both the target winning numbers and the n winning numbers and whose quantities are the largest.

With this determining mechanism, accuracy of winning numbers is effectively improved.

With reference to any one of the first aspect or the first to the fourth implementations of the first aspect, in a fifth implementation of the first aspect, the decrypting, by the first node in a third period of time, the n encrypted random parameters by using the n mapping relationships and the n keys, to obtain a target random parameter set, and generating target winning numbers by using the target random parameter set includes:

decrypting, by the first node in the third period of time, the n encrypted random parameters by using the n mapping relationships and the n keys, to obtain n target random parameters;

determining, by the first node, a second candidate random parameter set from the n target random parameters according to a preset filter criterion, where the second candidate random parameter set includes m candidate random parameters, m≤n, and m is a positive integer; and generating, by the first node, the target winning numbers by using the second candidate random parameter set.

By using a comparison with a random parameter set obtained by another node, each node finally generates the target winning numbers by using a same random parameter set. This improves data reliability and lot drawing fairness.

With reference to any one of the first aspect or the first to the fifth implementations of the first aspect, in a sixth implementation of the first aspect of the present invention, the method further includes at least one of the following cases:

if the first node receives, after the first period of time, a new encrypted random parameter sent by a second node that newly participates in a lot drawing, discarding, by the first node, the new encrypted random parameter;

if the first node receives, after the second period of time, a new mapping relationship and a new key that are sent by a second node that newly participates in a lot drawing, discarding, by the first node, the new mapping relationship and the new key; or discarding, by the first node in the third period of time, an encrypted random parameter that fails to be decrypted and that is in the n encrypted random parameters.

By setting this mechanism, a valid encrypted random parameter, mapping relationship, key, or the like that participates in the lot drawing is selected, and a node that does not enter a lot drawing process within a specified time is eliminated. This improves the data validity and reliability and the lot drawing fairness, and reduces a probability of a pseudo encrypted random parameter to some extent.

With reference to any one of the first aspect or the first to the sixth implementations of the first aspect, in a seventh implementation of the first aspect of the present invention, an algorithm used to generate the target winning numbers by using the target random parameter set is irreversible and unpredictable.

This can improve randomness and impartiality of the foregoing target winning numbers.

A second aspect of the present invention provides a first node, where the first node includes:

a receiving module, configured to receive, in a first period of time, n encrypted random parameters sent by n second nodes in a system, where n is a positive integer; and receive, in a second period of time, n mapping relationships and n keys that are sent by the n second nodes, where each mapping relationship is a one-to-one mapping relationship between an encrypted random parameter and a key; and a processing module, configured to decrypt, in a third period of time, the n encrypted random parameters by using the n mapping relationships and the n keys, to obtain a target random parameter set, and generate target winning numbers by using the target random parameter set, where the first period of time, the second period of time, and the third period of time are chronologically arranged in ascending order.

It can be learned from the foregoing technical solutions that, in the present invention, the first node obtains the target random parameter set according to the received n encrypted random parameters, n mapping relationships, and n keys, and generates the target winning numbers by using the target random parameter set. Each node that participates in the lot drawing is set to participate in the process of generating the winning numbers, so that each node can generate the winning numbers and verify impartiality of the winning numbers, thereby increasing randomness of a random parameter.

BRIEF DESCRIPTION OF DRAWINGS

FIG. 4-1 is another structural diagram of a first node according to an embodiment of the present invention.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. However, it will be apparent to one skilled in the art that the subject matter may be practiced without these specific details. In other instances, well-known methods, procedures, components, and circuits have not been described in detail so as not to unnecessarily obscure aspects of the embodiments.

In the specification, claims, and accompanying drawings of the present invention, the terms "first", "second", and so on are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those modules, but may include other modules not expressly listed or inherent to such a process, method, system, product, or device. The module division in this specification is merely logical division and may be other division in actual implementation. For example, a plurality of modules may be combined or integrated into another system, or some features may be ignored or not performed. In addition, the displayed or discussed mutual couplings or direct couplings or communication connections may be implemented by using some interfaces. The indirect couplings or communication connections between the modules may be implemented in electronic or other forms. This is not limited in this specification. Furthermore, a module or a submodule described as a separate part may or may not be physically separate, and may or may not be a physical module, or may be distributed in a plurality of circuit modules. Some or all modules may be selected according to actual needs to achieve objectives of solutions of the embodiments of the present invention.

The embodiments of the present invention provide a method for generating winning numbers and an apparatus that are used in scenarios such as a commercial activity (for example, a lot drawing, a lottery, selection of a lucky user, and the like), allocation of a valuable government or civilian resource (for example, a license plate number, a school enrollment qualification, and the like), and game application (for example, sending a WeChat red envelope and obtaining a virtual item). Details are described below.

A current lot drawing mechanism and a supervisory platform are controlled by a minority. Even if strength of random numbers for generating winning numbers is high, the public, a lottery agency, or the like cannot not verify authenticity of a lot drawing process. The following ideas are used to improve fairness of winning a lottery in the present invention:

1. Random parameters entered into a computer are generated by all terminals that participate in a lot drawing.

2. Each terminal receives a mapping relationship between an encrypted random parameter and a key, an encrypted random parameter, and a key that are sent by another terminal that participates in the lot drawing.

The mapping relationship is temporarily generated by a corresponding terminal, and therefore each terminal receives multiple mapping relationships, multiple encrypted random parameters, and multiple keys.

That is, each terminal broadcasts a random parameter generated by the terminal itself to the other terminals that participate in the lot drawing. In this way, after obtaining all random parameters, the another terminal can generate winning numbers by using these random parameters.

3. The terminal decrypts the received encrypted random parameter by using the foregoing mapping relationship and key to obtain all random parameters that actually participate in the lot drawing, and generates final winning numbers by using these random parameters. Theoretically, final winning numbers obtained by all terminals by means of calculation are the same, provided that all the obtained random parameters are valid.

Figure 1:
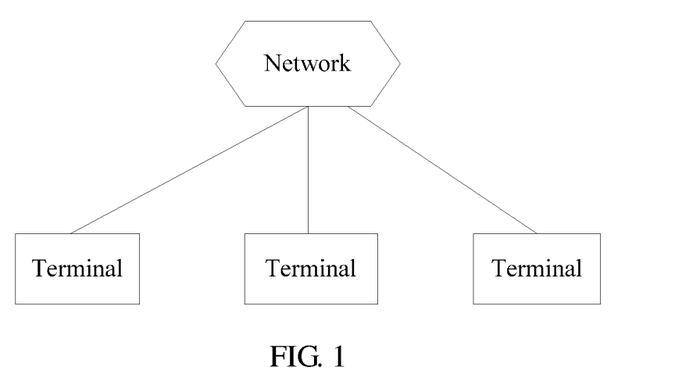
FIG. 1 is a structural diagram of a distributed system according to an embodiment of the present invention.
Figure 2:
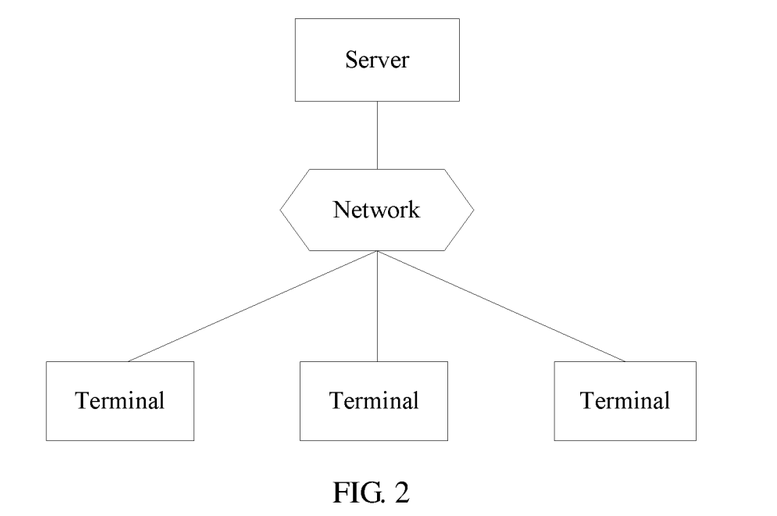
FIG. 2 is a diagram of a server-terminal structure according to an embodiment of the present invention.

Technical solutions in the present invention may be applied to a distributed system (shown in FIG. 1) and a server-terminal system (shown in FIG. 2), and therefore a node in this specification may be a terminal or a server. In the distributed system, each terminal that participates in generating winning numbers is connected in a wireless or wired communication manner. Each terminal may generate the winning numbers and verify impartiality and randomness of the winning numbers, and there may be a control device used to control all terminals. In the server-terminal system, each terminal that participates in generating the winning numbers is connected, in a wireless or wired communication manner, to a server that generates the winning numbers. The server performs centralized management on all terminals. Both the server and the terminal can generate the winning numbers, and each terminal can verify the impartiality of the winning numbers.

Figure 3:
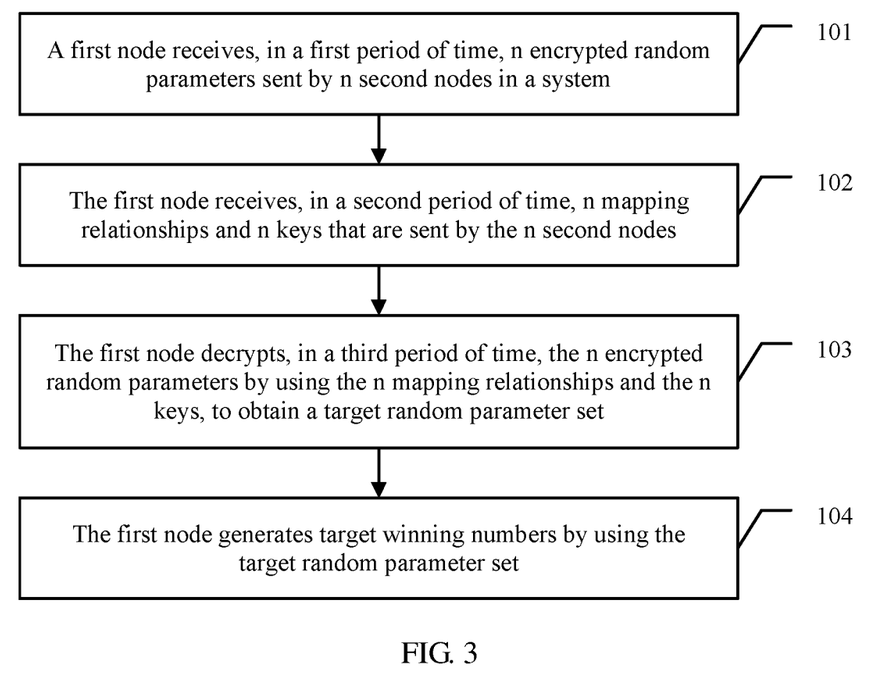
FIG. 3 is a flowchart of a method for generating winning numbers according to an embodiment of the present invention.

Referring to FIG. 3, a method for generating winning numbers is described below by using an example, and an embodiment of the present invention includes the following steps.

101. A first node receives, in a first period of time, n encrypted random parameters sent by n second nodes in a system.

n is a positive integer, and the first node receives, only in the first period of time, the n encrypted random parameters sent by other nodes. In addition, in the first period of time, the first node generates an encrypted random parameter required for a lot drawing, and sends the encrypted random parameter to the n second nodes. n is a quantity of all nodes that prepare to participate in the lot drawing and that access the system. However, the first node uses only the encrypted random parameters received in the first period of time as candidate parameters for generating the winning numbers.

102. The first node receives, in a second period of time, n mapping relationships and n keys that are sent by the n second nodes.

Each mapping relationship is a one-to-one mapping relationship between an encrypted random parameter and a key. That is, after generating an encrypted random parameter and a key, each node temporarily generates a mapping relationship between the encrypted random parameter and the key, and broadcasts the mapping relationship and the key to another node. Moreover, the first node uses only the mapping relationships and the keys that are received in the second period of time as candidate information.

103. The first node decrypts, in a third period of time, the n encrypted random parameters by using the n mapping relationships and the n keys, to obtain a target random parameter set.

The target random parameter set is a set of valid random parameters that are successfully obtained by means of description in the third period of time.

104. The first node generates target winning numbers by using the target random parameter set.

The first period of time, the second period of time, and the third period of time are chronologically arranged in ascending order.

In addition, to improve randomness and impartiality of the foregoing target winning numbers, a one-way and irreversible algorithm with a chaotic motion such as a one-way hash algorithm or a secure hash algorithm (SHA) may be used. The chaotic motion is unpredictable in the long term. Details are not limited in this specification.

Optionally, before the first node receives, in the first period of time, the encrypted random parameters sent by the n second nodes in the system, to reduce a time difference in receiving or sending data by each node in the system, and to reduce a problem, of a great difference in the winning numbers finally obtained by each node, caused by a timeasynchronization-induced difference in a target random parameter set obtained by each node, the method further includes:

sending, by the first node, synchronization information to the n second nodes in the system, where the synchronization information is used for synchronization between the n second nodes and the first node. In a distributed system, a control device may be set to manage time. In a server-terminal system, a server can manage time. Details are not limited in this specification.

It can be understood that, when the first node is a server, and the second node is a terminal, the server can generate final target winning numbers by using only the encrypted random parameter sent by the terminal; when the first node is a terminal, and the second node is a terminal, the terminal generates the final target winning numbers by using a random parameter generated by the terminal itself and an encrypted random parameter sent by the other terminal.

In this embodiment of the present invention, the first node obtains the target random parameter set according to the received n encrypted random parameters, n mapping relationships, and n keys, and generates the target winning numbers by using the target random parameter set. Each node that participates in the lot drawing is set to participate in a process of generating the winning numbers. In this way, each node can generate the winning numbers and verify impartiality of the winning numbers, thereby increasing randomness of a random parameter. In addition, with all-people participation, fun of a lot drawing process may further be improved, and more users are attracted to participate in the lot drawing, thereby improving user experience.

Optionally, in some embodiments of the invention, after the first node decrypts, in the third period of time, the n encrypted random parameters by using the n mapping relationships and the n keys, to obtain the target random parameter set, the method further includes at least one of the following items:

1. The first node sends the target random parameter set to the n second nodes in a fourth period of time, so that another second node can obtain a difference by means of a comparison between n target random parameters sent by the first node and a random parameter set obtained by the another second node itself. It can be understood that each node may receive a random parameter set sent by another node that participates in the lot drawing. Therefore, each node can determine and obtain a random parameter set with a smallest difference, and generate the final winning numbers by using the random parameter set with the smallest difference, and also can verify validity of the random parameter set of each node for generating the winning numbers, so that data validity and impartiality are effectively improved.

2. The first node sends the target winning numbers to the n second nodes in the fourth period of time. The first node sends the target winning numbers generated by the first node itself to other second nodes. In this way, these second nodes can determine a difference between winning numbers generated by these second nodes themselves and winning numbers generated by another node, and use winning numbers with a smallest difference as the final winning numbers, so that data accuracy is effectively improved. It can be understood that each node may receive winning numbers sent by another node that participates in the lot drawing.

Optionally, in some embodiments of the invention, after the first node sends the target random parameter set to the n second nodes in the fourth period of time, or after the first node sends the target winning numbers to the n second nodes in the fourth period of time, the method further includes:

receiving, by the first node in the fourth period of time, n winning numbers sent by the n second nodes;

counting a quantity of winning numbers that exist in both the target winning numbers and the n winning numbers; and using, by the first node as the target winning numbers, winning numbers that exist in both the target winning numbers and the n winning numbers and whose quantities are the largest.

With this determining mechanism, accuracy of winning numbers is effectively improved.

Optionally, in some embodiments of the invention, although a random parameter set finally obtained by each terminal should be consistent theoretically, a sample of the random parameter set finally obtained by each terminal is inconsistent in consideration of a cause such as a few terminals are manipulated, or an identity is invalid, or a sent random parameter is invalid because time of participating in the lot drawing this time is late, or the sent encrypted random parameter fails to be decrypted and is invalid. Consequently, authenticity and validity of a random parameter obtained by the first node are affected. A sample error can be reduced by using the following manners for determining.

1. After the first node decrypts, in the third period of time, the n encrypted random parameters by using the n mapping relationships and the n keys, to obtain the target random parameter set, and before the first node generates the target winning numbers by using the target random parameter set, the method further includes:

receiving, by the first node in the fourth period of time, random parameter sets sent by the n second nodes; where optionally, each node broadcasts a random parameter set obtained by the node itself to another node; in addition, after receiving a query request sent by any second node, the first node sends the target random parameter set obtained by the first node itself to the requesting node, so that each node can verify reliability of winning numbers generated by another node;

comparing the n random parameter sets sent by the n second nodes with the target random parameter set; and determining, from the n random parameter sets and the target random parameter set, a first candidate random parameter set that has a smallest difference with the other random parameter sets.

The generating target winning numbers by using the target random parameter set includes:

generating, by the first node, the target winning numbers by using the first candidate random parameter set.

It can be understood that, due to an external factor such as a change in a node that participates in the lot drawing, or a data transmission failure, there may be a difference in a random parameter set obtained by each node within a stipulated time. By using a comparison with a random parameter set obtained by another node, each node finally generates the target winning numbers by using a same random parameter set. This improves data reliability and lot drawing fairness.

Even if not all nodes select a same random parameter set to generate the target winning numbers finally, a process of generating winning numbers by another node that participates in the lot drawing can still be seen, and therefore reliability of winning numbers generated by each node can be verified.

2. The first node decrypts, in the third period of time, the n encrypted random parameters by using the n mapping relationships and the n keys, to obtain the n target random parameters.

The first node determines a second candidate random parameter set from the n target random parameters according to preset a filter criterion. The second candidate random parameter set includes m candidate random parameters, m≤n, and m is a positive integer. The preset filter criterion may be identity verification on a node, for example, about whether the node is a valid terminal that participates in the lot drawing. Alternatively, the preset filter criterion may be using a filter for selection, for example, only a digit is selected, and a letter or a symbol is removed.

The first node generates the target winning numbers by using the second candidate random parameter set.

Optionally, in some embodiments of the invention, to improve management on the final winning numbers, some rules may further be set to filter the received encrypted random parameter, mapping relationship, and key, so that data is authentic and valid, and has timeliness to some extent. Therefore, when selecting a valid encrypted random parameter, a valid mapping relationship, and a valid key, this method may further include at least one of the following cases:

a. If the first node receives, after the first period of time, a new encrypted random parameter sent by a second node that newly participates in the lot drawing, the first node discards the new encrypted random parameter. By setting this mechanism, a valid encrypted random parameter that participates in the lot drawing is selected, and a node that does not enter a lot drawing process within a specified time is eliminated. This improves the data reliability and the lot drawing fairness, and reduces a probability of a pseudo encrypted random parameter to some extent.

b. If the first node receives, after the second period of time, a new mapping relationship and a new key that are sent by a second node that newly participates in the lot drawing, the first node discards the new mapping relationship and the new key. It can be learned that, by using a time limitation, only the mapping relationship and the key that are received in the second period of time are selected. On a basis of the case 1, a further limitation on data of a valid node that participates in the lot drawing can improve the data reliability and reduce the probability of a pseudo encrypted random parameter.

c. In the third period of time, the first node discards an encrypted random parameter that fails to be decrypted and that is in the n encrypted random parameters. By using this mechanism, data that fails to be verified is further excluded, and the data validity and reliability are effectively improved.

Figure 4:
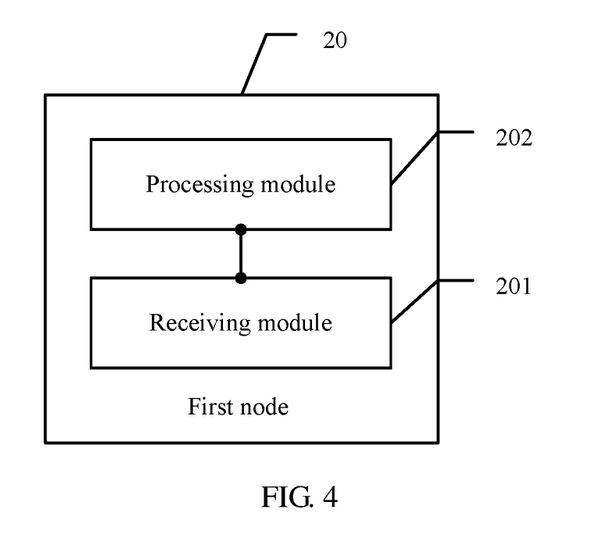
FIG. 4 is a structural diagram of a first node according to an embodiment of the present invention.

Referring to FIG. 4, a first node 20 for performing the foregoing method for generating winning numbers is described below, and the first node 20 includes:

a receiving module 201, configured to receive, in a first period of time, n encrypted random parameters sent by n second nodes in a system, where n is a positive integer; and receive, in a second period of time, n mapping relationships and n keys that are sent by the n second nodes, where each mapping relationship is a one-to-one mapping relationship between an encrypted random parameter and a key; and a processing module 202, configured to decrypt, in a third period of time, the n encrypted random parameters by using the n mapping relationships and the n keys, to obtain a target random parameter set, and generate target winning numbers by using the target random parameter set, where the first period of time, the second period of time, and the third period of time are chronologically arranged in ascending order.

In this embodiment of the present invention, the processing module 202 obtains the target random parameter set according to the received n encrypted random parameters, n mapping relationships, and n keys, and generates the target winning numbers by using the target random parameter set. Each node that participates in the lot drawing is set to participate in a process of generating the winning numbers. In this way, each node can generate the winning numbers and verify impartiality of the winning numbers, thereby increasing randomness of a random parameter. In addition, with all-people participation, fun of a lot drawing process may further be improved, and more users are attracted to participate in the lot drawing, thereby improving user experience.

Figure 41:
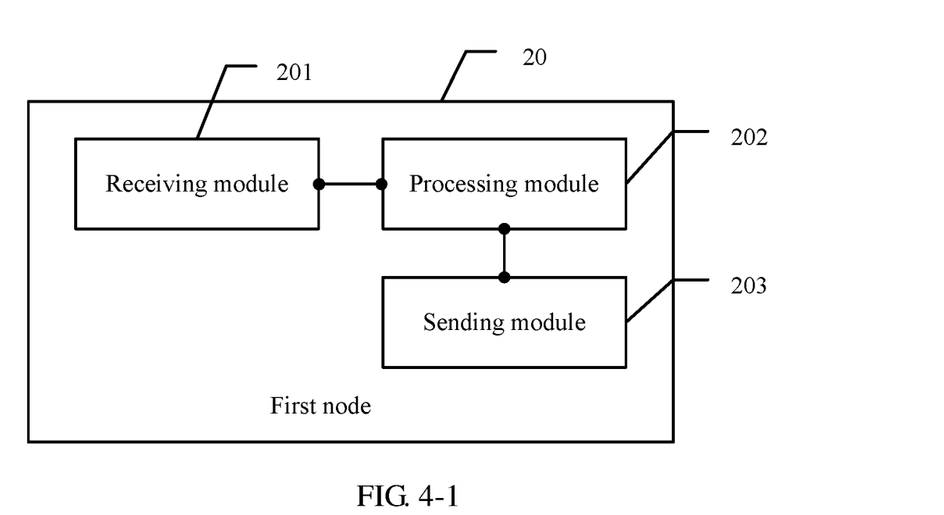

Optionally, in some embodiments of the invention, referring to FIG. 4-1, the first node 20 further includes a sending module 203, and the sending module 203 is configured to execute at least one of the following items:

1. The sending module 203 sends the target random parameter set to the n second nodes in a fourth period of time. In this way, another second node can obtain a difference by means of a comparison between the target random parameter set sent by the first node and a random parameter set obtained by the another second node itself, so that data validity and impartiality are improved.

2. The sending module 203 sends the target winning numbers to the n second nodes in the fourth period of time. The first node sends the target winning numbers generated by the first node itself to other second nodes. In this way, these second nodes can determine a difference between winning numbers generated by these second nodes themselves and winning numbers generated by another node, and use winning numbers with a smallest difference as the final winning numbers, so that data accuracy is effectively improved.

Optionally, in some embodiments of the invention, the receiving module 201 is further configured to:

receive, in the fourth period of time, n winning numbers sent by the n second nodes.

The processing module 202 is further configured to:

count a quantity of winning numbers that exist in both the target winning numbers and the n winning numbers; and use, as the target winning numbers, winning numbers that exist in both the target winning numbers and the n winning numbers and whose quantities are the largest.

With this determining mechanism, accuracy of winning numbers is effectively improved.

Optionally, in some embodiments of the invention, although a random parameter set finally obtained by each terminal should be consistent theoretically, a sample of the random parameter set finally obtained by each terminal is inconsistent in consideration of a cause such as a few terminals are manipulated, or an identity is invalid, or a sent random parameter is invalid because time of participating in the lot drawing this time is late, or the sent encrypted random parameter fails to be decrypted and is invalid. Consequently, authenticity and validity of a random parameter obtained by the first node are affected. A sample error can be reduced by using the following manners for determining.

1. The receiving module 201 receives, in the fourth period of time, random parameter sets sent by the n second nodes.

The processing module 202 compares the n random parameter sets sent by the n second nodes with the target random parameter set;

determines, from the n random parameter sets and the target random parameter set, a first candidate random parameter set that has a smallest difference with the other random parameter sets; and generates the target winning numbers by using the first candidate random parameter set.

2. The processing module 202 decrypts, in the third period of time, the n encrypted random parameters by using the n mapping relationships and the n keys, to obtain the n target random parameters;

determines a second candidate random parameter set from the n target random parameters according to a preset filter criterion, where the second candidate random parameter set includes m candidate random parameters, m≤n, and m is a positive integer; and generates the target winning numbers by using the second candidate random parameter set.

Optionally, in some embodiments of the invention, to improve management on the final winning numbers, some rules may further be set to filter the received encrypted random parameter, mapping relationship, and key, so that data is authentic and valid, and has timeliness to some extent. Therefore, when selecting a valid encrypted random parameter, a valid mapping relationship, and a valid key, the processing module 202 is further configured to implement at least one of the following cases:

1. If the receiving module 201 receives, after the first period of time, a new encrypted random parameter sent by a second node that newly participates in the lot drawing, the new encrypted random parameter is discarded. By setting this mechanism, a valid encrypted random parameter that participates in the lot drawing is selected, and a node that does not enter a lot drawing process within a specified time is eliminated. This improves the data reliability and the lot drawing fairness, and reduces a probability of a pseudo encrypted random parameter to some extent.

2. If the receiving module 201 receives, after the second period of time, a new mapping relationship and a new key that are sent by a second node that newly participates in the lot drawing, the new mapping relationship and the new key are discarded. By using a time limitation, only the mapping relationship and the key that are received in the second period of time are selected. On a basis of the case 1, a further limitation on data of a valid node that participates in the lot drawing can improve the data reliability and reduce the probability of a pseudo encrypted random parameter.

3. In the third period of time, an encrypted random parameter that fails to be decrypted and that is in the n encrypted random parameters is discarded. By using this mechanism, data that fails to be verified is further excluded, and the data validity and reliability are effectively improved.

Optionally, in some embodiments of the invention, an algorithm used to generate the target winning numbers by using the target random parameter set is irreversible and unpredictable. Because the algorithm is unpredictable, it is more random. Generally, an algorithm with a chaotic motion is used. The algorithm is characterized by long-term unpredictability, and therefore can further improve data randomness and reliability.

Optionally, in some embodiments of the invention, to reduce a time difference in receiving or sending data by each node in the system, and to reduce a problem, of a great difference in the winning numbers finally obtained by each node, caused by a time-asynchronization-induced difference in a target random parameter set obtained by each node, the sending module 203 is further configured to:

send synchronization information to the n second nodes in the system, where the synchronization information is used for synchronization between the n second nodes and the first node.

The present invention further provides a computer storage medium, and a program is stored in the medium. When executed, the program includes some or all steps of the foregoing method for generating winning numbers.

The present invention further provides a computer storage medium, and a program is stored in the medium. When executed, the program includes some or all steps of the foregoing method, for generating winning numbers, executed by a first node.

Figure 5:
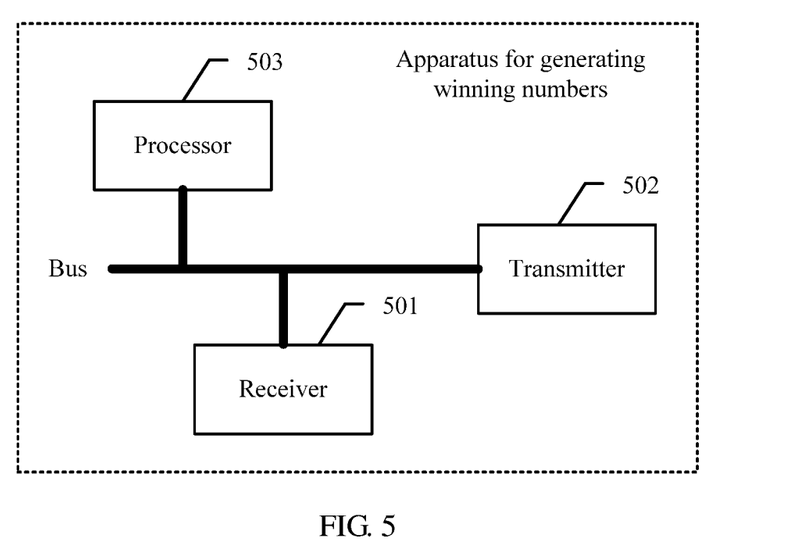
FIG. 5 is another structural diagram of a first node according to an embodiment of the present invention.

FIG. 5 is another structural diagram of a first node 50 according to an embodiment of the present invention. The first node 50 may include at least one network interface or another communications interface, at least one receiver 501, at least one transmitter 502, at least one processor 503, and a memory 504, so as to implement connection and communication between these apparatuses. By using the at least one network interface (wired or wireless), a communications connection between a system gateway and at least one other network element is implemented, so that the Internet, a wide area network, a local network, a metropolitan area network, or the like can be used.

The memory 504 may include a read-only memory and a random access memory, and provides an instruction and data for the processor 503. A part of the memory 504 may further include a high-speed random access memory (RAM), and may further include a non-volatile memory.

The memory 504 stores the following elements: an operation instruction and an operating system, and an executable module or a data structure of the operation instruction and the operating system, or a subset of the operation instruction and the operating system, or an extension set of the operation instruction and the operating system.

The operation instruction includes various operation instructions, and is used to implement various operations.

The operating system includes various system programs, and is used to implement various basic services and process a hardware-based task.

In this embodiment of the present invention, by invoking the operation instruction (the operation instruction may be stored in the operating system) stored in the memory 504, the processor 503 is configured to:

receive, by using the receiver 501 in a first period of time, n encrypted random parameters sent by n second nodes in a system, and receive, in a second period of time, n mapping relationships and n keys that are sent by the n second nodes, where each mapping relationship is a one-to-one mapping relationship between an encrypted random parameter and a key; and decrypt, in a third period of time, the n encrypted random parameters by using the n mapping relationships and the n keys, to obtain a target random parameter set, and generate target winning numbers by using the target random parameter set, where the first period of time, the second period of time, and the third period of time are chronologically arranged in ascending order.

In some implementations, the foregoing processor 503 may be further configured to:

send the n target random parameters to the n second nodes in a fourth period of time, where the receiver 501 receives, in the fourth period of time, random parameter sets sent by the n second nodes;

compare the n random parameter sets sent by the n second nodes with the target random parameter set;

determine, from the n random parameter sets and the target random parameter set, a first candidate random parameter set that has a smallest difference with the other random parameter sets; and generate the target winning numbers by using the first candidate random parameter set.

In some implementations, the foregoing processor 503 may be further configured to:

send the target winning numbers to the n second nodes in the fourth period of time, where the receiver 501 is used to receive, in the fourth period of time, n winning numbers sent by the n second nodes;

count a quantity of winning numbers that exist in both the target winning numbers and the n winning numbers; and use, as the target winning numbers, winning numbers that exist in both the target winning numbers and the n winning numbers and whose quantities are the largest.

In some implementations, the foregoing processor 503 may be further configured to:

decrypt, in the third period of time, the n encrypted random parameters by using the n mapping relationships and the n keys, to obtain the n target random parameters;

determine a second candidate random parameter set from the n target random parameters according to a preset filter criterion, where the second candidate random parameter set includes m candidate random parameters, m≤n, and m is a positive integer; and generate the target winning numbers by using the second candidate random parameter set.

In some implementations, the foregoing processor 503 may be further configured to:

if the receiver 501 receives, after the first period of time, a new encrypted random parameter sent by a second node that newly participates in a lot drawing, discard the new encrypted random parameter;

if the receiver 501 receives, after the second period of time, a new mapping relationship and a new key that are sent by a second node that newly participates in a lot drawing, discard the new mapping relationship and the new key; or discard, in the third period of time, an encrypted random parameter that fails to be decrypted and that is in the n encrypted random parameters.

In some implementations, the foregoing processor 503 may be further configured to:

send synchronization information to the n second nodes in the system by using the transmitter 502, where the synchronization information is used for synchronization between the n second nodes and the first node.

Optionally, an algorithm used to generate the target winning numbers by using the target random parameter set is irreversible and unpredictable.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

A method for generating winning numbers and an apparatus provided in the present invention are described in detail above. The principle and implementation of the present invention are described in the specification by using specific embodiments. The description about the embodiments is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. A method for generating winning numbers in a system having a plurality of network nodes, the method comprising:

receiving, by a first node in a first period of time, n encrypted random parameters sent by n second nodes in the system, wherein n is a positive integer;

receiving, by the first node in a second period of time, n mapping relationships and n keys that are sent by the n second nodes, wherein each mapping relationship is a one-to-one mapping relationship between an encrypted random parameter and a key; and decrypting, by the first node in a third period of time, the n encrypted random parameters by using the n mapping relationships and the n keys, to obtain a target random parameter set, and generating target winning numbers by using the target random parameter set, wherein the first period of time, the second period of time, and the third period of time are chronologically arranged in an ascending order.

2. The method according to claim 1, wherein after the first node decrypting the n encrypted random parameters in the third period of time, the method further comprises:
sending, by the first node, the target random parameter set to the n second nodes in a fourth period of time.

3. The method according to claim 2, wherein after the first node decrypting the n encrypted random parameters in a third period of time, and before the generating the target winning numbers, the method further comprises:
receiving, by the first node in the fourth period of time, n random parameter sets sent by the n second nodes;
comparing the n random parameter sets sent by the n second nodes with the target random parameter set; and
determining, from the n random parameter sets and the target random parameter set, a first candidate random parameter set that has a smallest difference with other random parameter sets; and
wherein the generating the target winning numbers comprises:
generating, by the first node, the target winning numbers by using the first candidate random parameter set.

4. The method according to claim 1, wherein after the first node decrypting the n encrypted random parameters in the third period of time, the method further comprises:
sending, by the first node, the target winning numbers to the n second nodes in a fourth period of time.

5. The method according to claim 4, wherein after the first node sending the target random parameter set to the n second nodes in the fourth period of time, or after the first node sending the target winning numbers to the n second nodes in the fourth period of time, the method further comprises:
receiving, by the first node in the fourth period of time, n winning numbers sent by the n second nodes;
counting a quantity of winning numbers that exist in both the target winning numbers and the n winning numbers; and
using, by the first node as the target winning numbers, winning numbers that exist in both the target winning numbers and the n winning numbers and whose quantities are the largest.

6. The method according to claim 1, wherein the first node decrypting the n encrypted random parameters in the third period of time, and the generating the target winning numbers comprises:
decrypting, by the first node in the third period of time, the n encrypted random parameters by using the n mapping relationships and the n keys, to obtain n target random parameters;
determining, by the first node, a second candidate random parameter set from the n target random parameters according to a preset filter criterion, wherein the second candidate random parameter set comprises m candidate random parameters, m≤n, and m is a positive integer; and
generating, by the first node, the target winning numbers by using the second candidate random parameter set.

7. The method according to claim 1, wherein the method further comprises at least one of the following:
if the first node receives, after the first period of time, a new encrypted random parameter sent by a second node that newly participates in a lot drawing, discarding, by the first node, the new encrypted random parameter;

if the first node receives, after the second period of time, a new mapping relationship and a new key that are sent by the second node that newly participates in the lot drawing, discarding, by the first node, the new mapping relationship and the new key.

8. The method according to claim 1, wherein an algorithm used to generate the target winning numbers by using the target random parameter set is irreversible and unpredictable.

9. The method according to claim 1, wherein before the first node receiving the encrypted random parameters in the first period of time, the method further comprises:
sending, by the first node, synchronization information to the n second nodes in the system, wherein the synchronization information is used for synchronization between the n second nodes and the first node.

10. A first node, comprising:
a receiver, configured to receive, in a first period of time, n encrypted random parameters sent by n second nodes in a system, wherein n is a positive integer; and
receive, in a second period of time, n mapping relationships and n keys that are sent by the n second nodes, wherein each mapping relationship is a one-to-one mapping relationship between an encrypted random parameter and a key; and
a processor, configured to decrypt, in a third period of time, the n encrypted random parameters by using the n mapping relationships and the n keys, to obtain a target random parameter set, and generate target winning numbers by using the target random parameter set, wherein
the first period of time, the second period of time, and the third period of time are chronologically arranged in an ascending order.

11. The first node according to claim 10, further comprising:
a transmitter, configured to send the target random parameters set to the n second nodes in a fourth period of time.

12. The first node according to claim 11, wherein the receiver is further configured to:
receive, in the fourth period of time, random parameter sets sent by the n second nodes; and
the processor is further configured to:
compare the n random parameter sets sent by the n second nodes with the target random parameter set;
determine, from the n random parameter sets and the target random parameter set, a first candidate random parameter set that has a smallest difference with other random parameter sets; and
generate the target winning numbers by using the first candidate random parameter set.

13. The first node according claim 10, wherein the transmitter is configured to send the target winning numbers to the n second nodes in a fourth period of time.

14. The first node according to claim 13, wherein the receiver is further configured to:
receive, in the fourth period of time, n winning numbers sent by the n second nodes; and
the processor is further configured to:
count a quantity of winning numbers that exist in both the target winning numbers and the n winning numbers; and
use, as the target winning numbers, winning numbers that exist in both the target winning numbers and the n winning numbers and whose quantities are the largest.

15. The first node according to claim 10, wherein the processor is configured to:
- decrypt, in the third period of time, the n encrypted random parameters by using the n mapping relationships and the n keys, to obtain n target random parameters;
- determine a second candidate random parameter set from the n target random parameters according to a preset filter criterion, wherein the second candidate random parameter set comprises m candidate random parameters, m≤n, and m is a positive integer; and
- generate the target winning numbers by using the second candidate random parameter set.

16. The first node according to claim 10, wherein the processor is further configured to execute at least one of the following:
- if the receiver receives, after the first period of time, a new encrypted random parameter sent by a second node that newly participates in a lot drawing, discarding the new encrypted random parameter;
- if the receiver receives, after the second period of time, a new mapping relationship and a new key that are sent by the second node that newly participates in the lot drawing, discarding the new mapping relationship and the new key.

17. The first node according to claim 10, wherein an algorithm used to generate the target winning numbers by using the target random parameter set is irreversible and unpredictable.

18. The first node according to claim 11, wherein the transmitter is further configured to:
- send synchronization information to the n second nodes in the system, wherein the synchronization information is used for synchronization between the n second nodes and the first node.

19. The method according to claim 1, further comprising:
- discarding, by the first node in the third period of time, an encrypted random parameter that fails to be decrypted and that is in the n encrypted random parameters.

20. The first node according to claim 10, wherein the processor is further configured to: discard, in the third period of time, an encrypted random parameter that fails to be decrypted and that is in the n encrypted random parameters.

* * * * *